(12) United States Patent
Kodama et al.

(10) Patent No.: US 6,585,242 B2
(45) Date of Patent: Jul. 1, 2003

(54) SWITCHING TYPE LIQUID-IN VIBRATION ISOLATING DEVICE

(75) Inventors: Yosei Kodama, Osaka (JP); Yukio Takashima, Osaka (JP); Nobuya Yoshida, Aichi (JP); Takashi Miyake, Aichi (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/077,347

(22) Filed: Feb. 15, 2002

(65) Prior Publication Data

US 2003/0011116 A1 Jan. 16, 2003

(30) Foreign Application Priority Data

Jul. 16, 2001 (WO) ................................ PCT/JP01/06142

(51) Int. Cl.$^7$ .................................................. F16F 5/00
(52) U.S. Cl. .................................................. 267/140.13
(58) Field of Search ........................ 267/140.11, 140.13; 248/562, 566, 636, 638

(56) References Cited

U.S. PATENT DOCUMENTS

| | | | |
|---|---|---|---|
| 5,462,261 A | 10/1995 | Eckel et al. | |
| 2001/0010413 A1 * | 8/2001 | Takashima et al. | 267/140.13 |
| 2001/0052664 A1 * | 12/2001 | Saitoh | 267/140.13 |

FOREIGN PATENT DOCUMENTS

| | | |
|---|---|---|
| JP | 08-270718 | 10/1996 |
| JP | 09-144805 | 6/1997 |
| JP | 09-196110 | 7/1997 |
| JP | 11-230242 | 8/1999 |
| JP | 2000-310274 | 11/2000 |
| JP | 2000-337428 | 12/2000 |
| JP | 2001-99223 | 4/2001 |

* cited by examiner

*Primary Examiner*—Christopher P. Schwartz
(74) *Attorney, Agent, or Firm*—Jordan and Hamburg LLP

(57) ABSTRACT

This invention provides a switching type liquid-in vibration isolating device capable of opening/closing an orifice by changing over between the atmospheric and negative pressure in a switching chamber corresponding to shake and idle vibration, respectively. In order to prevent a pipe, for introducing the atmospheric and negative pressure in the switching chamber, from disconnecting, a first and a second fitting 1, 2 are connected by a vibration isolating substrate 3, a partition member 4, a first and a second diaphragm 5, 6 are disposed within a hollow space thereof, a main liquid chamber 7 and a sub-liquid chamber 8 are interconnected by two inside and outside orifices 12, 13, a equilibrium chamber 9 is formed between the first and second diaphragm 5, 6, a switching chamber 10 is formed between the second diaphragm 6 and the second fitting 2, the center portion of the bottom wall 22 of the second fitting 2 is depressed toward the switching chamber 10, a pipe 11 is pierced into the top 25$a$ of the depressed portion 25 and received in the depressed portion 25, and a plurality of convex portions 29 for interference prevention are outwardly projectively provided on the bottom wall 22 around the depressed portion 25.

6 Claims, 4 Drawing Sheets

SWITCHING TYPE LIQUID-IN VIBRATION ISOLATING DEVICE

FIELD OF THE INVENTION

This invention relates to a switching type liquid-in vibration isolating device used to support a vibration generating source such as power unit of automobile for the purpose of vibration isolation.

DESCRIPTION OF THE RELATED ART

A liquid-in vibration isolator has heretofore been used as a mount supporting a vibration generating source such as vehicle engine so as not to transmit its vibration to a vehicle body.

As one of the liquid-in vibration isolators, a switching type liquid-in vibration isolating device, in which vibration isolating characteristics is changed over according to two kinds of vibration with different frequency range such as shake and idle vibration, has been suggested.

For example, in an official gazette JP-A-8-270718, a switching type liquid-in vibration isolating device as shown in FIG. 5 is disclosed.

This conventional vibration isolating device is equipped with a first fitting (101), a second fitting (102) in the form of a bottomed cylindrical body with its bottom wall located at a given distance in the direction of an axis from the first fitting (101), and a vibration isolating substrate (103) made of a rubber elastomer interposed between the first fitting (101) and the second fitting (102) to connect both fittings. Within a hollow space between the vibrating isolating substrate (103) and the second fitting (102), a partition member (104), a first diaphragm (105) and a second diaphragm (106) are disposed serially in the direction of an axis, a main liquid chamber (107) is formed between the vibration isolating substrate (103) and the partition member (104), and a sub-liquid chamber (108) is formed between the partition member (104) and the first diaphragm (105). Further, a equilibrium chamber (109) is formed between the first diaphragm (105) and the second diaphragm (106), and a switching chamber (110), capable of selectively introducing the atmospheric pressure and negative pressure, is formed between the second diaphragm (106) and the second fitting (102). An outside orifice (113) and an inside orifice (114) located further radially inwardly from the outside orifice (113) are disposed on the partition member (104) to interconnect the main liquid chamber (107) and the sub-liquid chamber (108). A coil spring (127) is disposed in the switching chamber (110) to force or push-in the first diaphragm (105) via the second diaphragm (106) against the partition member (104). A pipe (128) for introducing the atmospheric and negative pressure into the switching chamber (110) is pierced through the bottom wall of the second fitting (102). When the atmospheric pressure is brought through this pipe (128) into the switching chamber (110), the first diaphragm (105) is forced on the partition member (104) by the coil spring (127) to impede liquid flow between the inside orifice (114) and the sub-liquid chamber (108). However, since the first diaphragm (105) moves against an energizing force by the coil spring (127) when negative pressure is brought from the pipe (128) into the switching chamber (110), the first diaphragm (105) separates from the partition member (104) to make the inside orifice (114) connect to the sub-liquid chamber (108). Thus, as for the vibration isolating device, the inside orifice (114) can be opened and/or closed by selectively changing over between the atmospheric and negative pressure in the switching chamber (110), so that the orifice can be used selectively according to two kinds of vibration of different frequency range, respectively.

As for this known vibration isolating device, the pipe (128) for introducing the atmospheric and negative pressure into the switching chamber (110) is fitted and secured by a welding means and the like under a condition of projecting from the bottom surface of the second fitting (102). With the pipe (128) thus being projected, when the vibrating isolating device is placed on a work or transport stand before placing the vibration isolating device on board of the vehicle, the pipe (128) will support deadweight of the vibration isolating device, with the result that the pipe (128) may be disconnected. This pipe (128) is fixed to the second fitting (102) so that it is difficult to be pulled out of the second fitting (102) by taking into account after placing on board of the vehicle. That is, the pipe (128) is strong against a load in the direction of pulling and weak against a load in the direction of pushing in the switching chamber (110), therefore, before placing the vibration isolating device on board of the vehicle, a problem of disconnection of the pipe (128) is prone to occur.

DISCLOSURE OF THE INVENTION

In view of the descriptions above, this invention provides a liquid-in vibration isolating device capable of opening/closing an inside orifice out of two inside and outside orifices by selectively changing over between the atmospheric and negative pressure in a switching chamber so as to selectively use orifices corresponding to two kinds of vibrations with different frequency range such as shake and idle vibration, and has an object of preventing a pipe for introducing the atmospheric and negative pressure into the switching chamber from disconnecting.

The switching type liquid-in vibration isolating device is equipped with a first fitting, a second fitting in the form of a bottomed cylindrical body with its bottom wall located at a given distance in the direction of an axis from the first fitting, a vibration isolating substrate made of a rubber elastomer interposed between the first and second fittings to connect both fittings, a partition member, a first and second diaphragm disposed serially in the direction of an axis within a hollow space between the vibration isolating substrate and the second fitting, a first liquid chamber formed between the vibration isolating substrate and the partition member, a second liquid chamber formed between the partition member and the first diaphragm, an outside orifice interconnecting between the first and second liquid chambers disposed on the partition member, an inside orifice located further radially inwardly from the outside orifice, a equilibrium chamber formed between the first diaphragm and the second diaphragm, a switching chamber formed between the second diaphragm and the second fitting capable of selectively introducing the atmospheric pressure and negative pressure, and energizing means forcing or pushing-in the first diaphragm against the partition member, and the first diaphragm is forced or pushed-in against the partition member by the energizing means to close the inside orifice when introducing the atmospheric pressure into the switching chamber, and further the first diaphragm is separated from the partition member against the energizing force exerted by the energizing means to open the inside orifice when introducing the negative pressure into the switching chamber, a part of the bottom wall of the second fitting being depressed toward the switching side, a pipe for introducing the atmospheric and negative pressure into the switching chamber being pierced into the top of the depressed portion and received in the depressed portion, and a plurality of convex portions outwardly projectively being provided on the bottom wall around the depressed portion.

Thus, it is possible that the pipe is not projected downwardly from the bottom surface of the second fitting by providing the depressed portion on the bottom wall of the second fitting and receiving the pipe, for introducing the pressure, inside the depressed portion. Therefore, when the vibrating isolating device is placed on a work or transport stand before placing the vibration isolating device on board of the vehicle, the pipe will no longer support deadweight of the vibration isolating device, capable of securely preventing the pipe from being disconnected.

Although it is desirable that the introducing pipe is completely received in the depressed portion, there are some cases where the pipe must be projected slightly downward from the inside of the depressed portion. That is, the pipe is required to be projected outwardly from the switching chamber to some extent to connect the piping from the switching valves when placing the device on board of the vehicle, the height of the depressed portion is limited by the dimensions of the switching chamber in the direction of an axis, etc. According to the vibration isolating device of the invention, even in such circumstances, it is possible to avoid the pipe from interfering with the placing surface of such as work or transport stands by means of the convex portions projectively provided outwardly around the depressed portion.

As for the vibration isolating device of the invention, a press-fitting area of the second diaphragm is secured at the circumferential edge portion of the bottom wall of the second fitting, and the second diaphragm may be press-fitted from the upper portion on the opening side of the second fitting and fixed in the press-fitted area. Thereby, it is not necessary to caulk and secure the second diaphragm in conjunction with the second fitting.

The energizing means in the vibration isolating device of the invention is a coil spring interposed between the bottom wall of the second fitting and the second diaphragm in the switching chamber, for forcing the first diaphragm via the second diaphragm against the partition member, a receiving surface of the coil spring may be secured on the bottom wall around the depressed portion of the second fitting, and the coil spring may be disposed on the receiving surface in such a manner as to surround the depressed portion. Thus, it is possible to position the lower extremity of the coil spring at the outer circumference of the depressed portion and prevent the coil spring from getting out of position on the bottom wall of the second fitting, by securing the receiving surface of the coil spring around the depressed portion for receiving the pipe and disposing the coil spring so as to surround the depressed portion.

As for the vibration isolating device of the invention, a stopper rubber may be provided on the second diaphragm, and an abutting surface of the stopper rubber portion may also be secured on the bottom wall around the depressed portion of the second fitting. Thus, undesired downward displacement of the second diaphragm can be limited when introducing the negative pressure into the switching chamber.

In this case, the convex portion can be provided on the bottom wall portion which corresponds to the abutting surface of the stopper rubber portion. Since it is not necessary to secure the abutting surface on the stopper rubber portion all over in the circumferential direction, the convex portion can be provided especially for such portion without impairing the performance.

With regard to the vibration isolating device of the invention, the depressed portion may be provided at the center portion of the bottom wall of the second fitting and the receiving surface of the coil spring may be secured around the depressed portion, and the abutting surface of the stopper rubber portion may also be secured between the receiving surface and the press-fitting area of the second diaphragm.

BEST MODE FOR CARRYING OUT THE INVENTION

Figure 1:
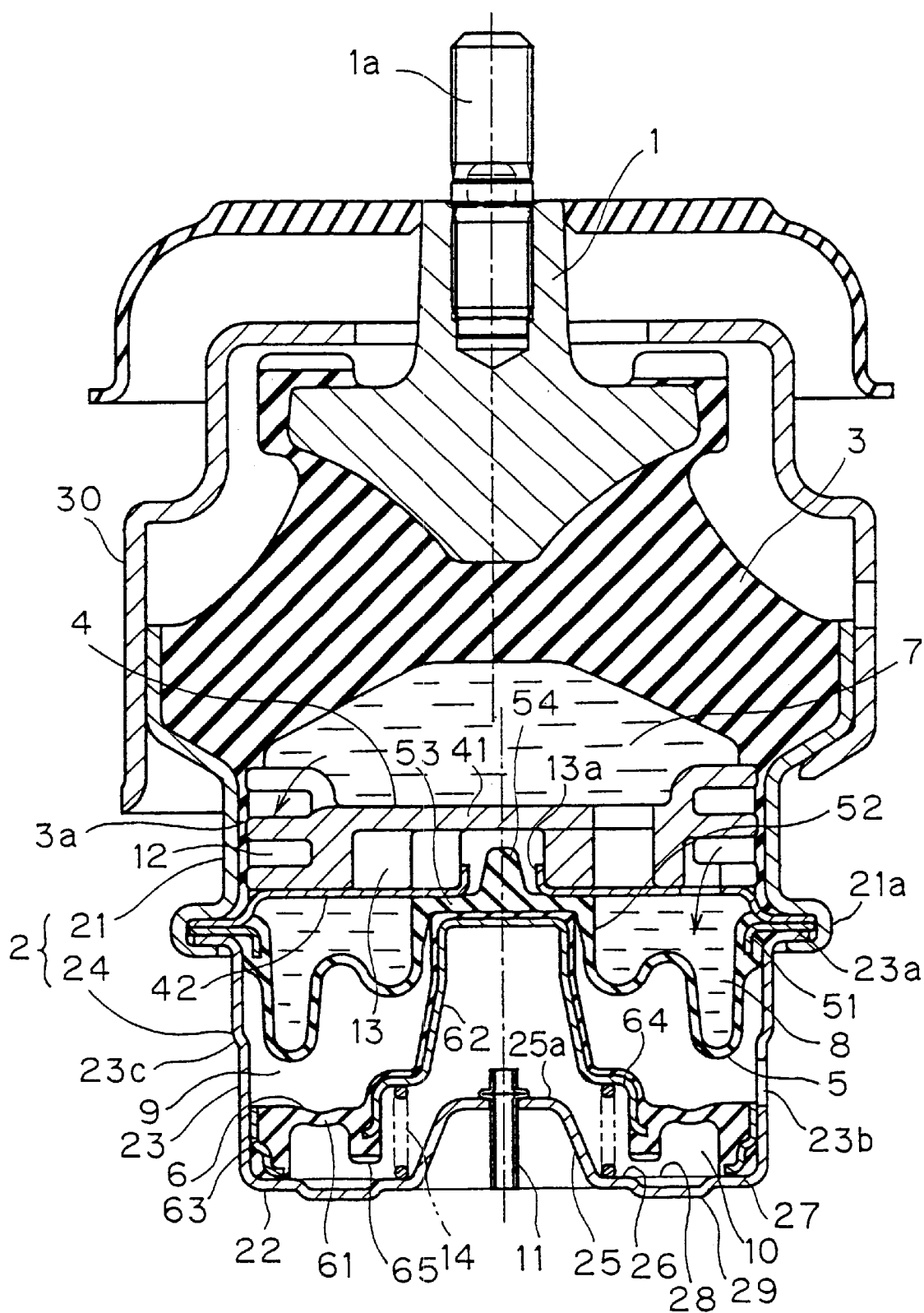
FIG. 1 is a longitudinal sectional view showing the state of introducing the atmospheric pressure into a switching chamber of a switching type liquid-in vibration isolating device of one embodiment of the invention.

The switching type liquid-in vibration isolating device of one embodiment of the invention will be hereinafter described by way of examples with reference to the accompanying drawings.

This switching type liquid-in vibration isolating device is equipped with a first fitting (1), a second fitting (2) in the form of a bottomed cylindrical body with its bottom portion located at a given distance in the direction of an axis from the first fitting (1), and a thick vibration isolating substrate (3) made of a rubber elastomer interposed between the first fitting (1) and the second fitting (2) to connect both fittings.

The first fitting (1) is in the form of a nearly top and made of materials such as metal materials having rigidity. An attachment bolt (1a) is projectively fitted at the center portion thereof. The first attachment fitting (1) is mainly fitted on a power unit such as vehicle engine, that is, on the vibration generating source side, by the attachment bolt (1a).

The second fitting (2) is also formed by the materials such as metal materials having rigidity. In the case of this embodiment, the second fitting (2) comprises a cylindrical fitting (21) with its upper portion vulcanization adhered to the vibration isolating substrate (3), a lid fitting (24) in the form of a cup made up of a bottom wall (22) and a cylindrical side wall (23), and a flanged upper extremity (23a) at the end of a side wall (23) of a lid fitting (24) is caulked and secured to a lower extremity (21a) of the cylindrical fitting (21). The second fitting (2) is mainly fitted on the vehicle body side by a bracket (not shown) provided on the outer circumference of the cylindrical fitting (21) and/or the lid fitting (24). Further a stopper fitting (30) is fitted on the upper portion outer circumference of the cylindrical fitting (24) to receive the vibration isolating substrate (3).

As shown in the drawings, the vibration isolating substrate (3) is in the form of a roughly umbrella and connected by vulcanization adhering means under a condition where the first fitting (1) is imbedded above the vibration isolating substrate (3). The cylindrical fitting (21) of the second fitting (2) is vulcanization adhered to the lower portion of the outer circumference of the vibration isolating substrate (3).

In a space between the vibration isolating substrate (3) and the bottom wall (22) of the second fitting (2), in due order from the vibration isolating substrate (3), a partition member (4), a first diaphragm (5) and a second diaphragm (6) made of a rubber film are disposed serially in the direction of an axis. A main liquid chamber (7) is formed between the vibration isolating substrate (3) and the partition member (4) to contain liquid, and a sub-liquid chamber (8) is formed between the partition member (4) and the first diaphragm (5) and interconnected, through an orifice described later, to the main liquid chamber (7).

Further, a equilibrium chamber (9) is formed between the first diaphragm (5) and the second diaphragm (6) and open to the atmosphere through a vent (23b) on a side wall (23) of the lid fitting (24) of the second fitting (2). A switching chamber (10) is formed between the second diaphragm (6) and the bottom wall (22) of the lid fitting (24) covering the lower surface thereof to be able to selectively introducing the atmosphere and negative pressure. The switching chamber (10) serves to switching between those conditions of introducing the atmospheric and negative pressure by means of external switching valve (not shown) through a pipe (11) described later to vary its volume. The equilibrium chamber (9) serves to relieve pressure difference between the sub-liquid chamber (8) and the switching chamber (10), thereby being contributable to durability of the diaphragms (5), (6) and controllable by introducing a small negative pressure into the switching chamber (10). It is also possible to seal hermetically the equilibrium chamber (9).

The partition member (4) is made up of a first member (41) formed by metals such as aluminum or synthetic resins and other rigid materials, and a second member (42) constituting a metal plate disposed under and below the first member (41). The first member (41) has a groove extending circumferentially for forming an outside orifice (12) along the outer circumference, and a groove extending circumferentially for forming an inside orifice (13) on the inside of the lower surface side. The first member (41) is hermetically fitted, through a sealing rubber portion (3a) formed in one piece with the vibration isolating substrate (3), on an inner circumference at the lower portion on the opening side of the cylindrical fitting (21) of the second fitting (2), together with the second member (42), thereby the groove on the outer circumference constitutes a pathway as outside orifice (12). Further, the inside groove constitutes a pathway as inside orifice (13) by the second member (42) covering the lower surface of the first member (41). An outlet portion (13a) to the sub-liquid chamber (8) of the inside orifice (13) is formed by downwardly opening the center portion of the partition member (4).

As compared with the inside orifice (13), the outside orifice (12) is designed to effectively act the vibration damping function at low frequency range (frequency range of shake vibration) by making its pathway longer or setting its sectional area smaller. The inside orifice (13) is designed to effectively act the vibration damping function at high frequency range (frequency range of idle vibration).

The first diaphragm (5) is provided with a ring-shaped collar fitting (51) vulcanization adhered to its outer circumferential portion. The collar fitting (51) is caulked and secured integrally with the circumferential edge portion of the second member (42) of the partition member (4) at the caulking and securing portion to the cylindrical fitting (21) and the lid fitting (24). A valve body (52) capable of coaxially blocking up an outlet portion (13a) of the inside orifice (13) is formed integrally at the center of the first diaphragm (5). The valve body (52) has a slightly thick flat rubber surface (53) abutting on the lower surface of the circumferential portion of the inside orifice (13) enclosed by the partition member (4), and a protrusion (54) for transverse slippage prevention fitted into the inside orifice (13) at the center of the flat rubber surface (53), so that the valve body (52) moves vertically to be able to open/close the inside orifice (13), with the protrusion (54) fitted into the outlet portion (13a).

The second diaphragm (6) is provided with a ring-shaped rubber portion (61) which is slightly thicker than the rubber film of the first diaphragm (5), and a forcing or pushing-in auxiliary member (62) assuming a nearly cap form section for abutting on the inner circumferential edge portion of the rubber portion (61) and forcing the flat rubber surface (53) from the equilibrium chamber (9) to the partition member (4), setting the valve body (52) vertically through the forcing or pushing-in auxiliary member (62). The second diaphragm (6) is equipped with a cylindrical ring-shaped fitting (63) vulcanization adhered to the outer circumferential portion thereof. The outer circumferential portion is press-fitted and secured so as to keep the lower extremity of the side wall (23) of the lid fitting (24) of the second fitting (2) in the state of airtightness. The side wall (23) of the lid fitting (24) has a stepped portion (23c), so that diameter on the lower side is slightly smaller than that on the upper side, thus the second diaphragm (6) is press-fitted into the lower side of smaller diameter on the lid fitting (24). Further, with regard to the second diaphragm (6), a stopper rubber portion (65) restraining the forcing or pushing-in auxiliary member (62) from falling is formed integrally with the rubber portion (61) so that the protrusion (54) of the valve body (52) is not pulled out or come off from the inside orifice (14) when introducing the negative pressure into the switching chamber (10).

A coil spring (14) is disposed in the switching chamber (10) as energizing means to force or push-in the valve body (52) of the first diaphragm (5) on the partition member (4) through the forcing or pushing-in auxiliary member (62) of the second diaphragm (6). The coil spring (14) is interposed between the stepped portion (64) of the forcing or pushing-in auxiliary member (62) and the bottom wall (22) side of the lid fitting (24).

Figure 3:
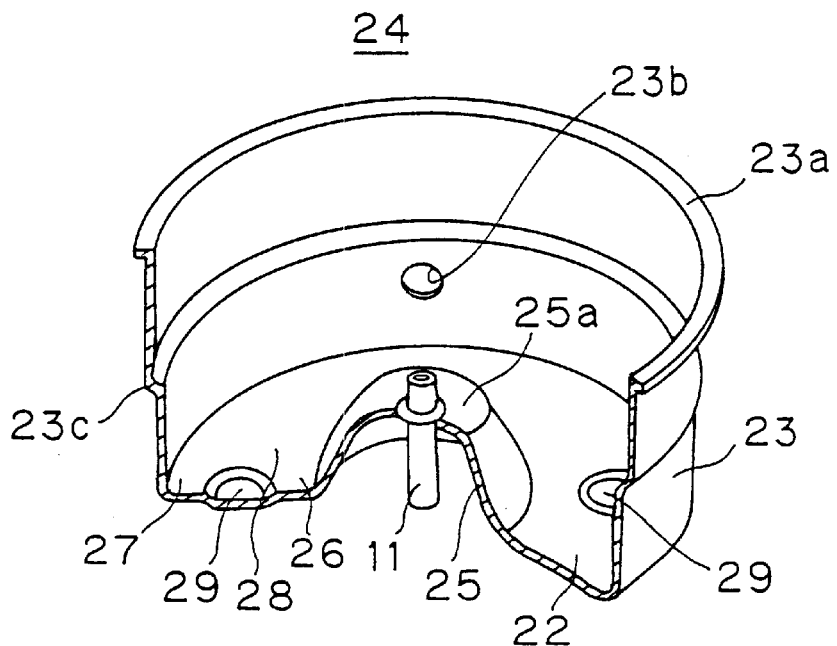
FIG. 3 is a partial cutaway perspective view of a lid fitting constituting a second fitting of the device.

A pipe (11) is pierced through the bottom wall (22) of the lid fitting (24) of the second fitting (2) to introduce the atmospheric and negative pressure into the switching chamber (10). As shown in FIGS. 1 and 3, the bottom wall (22) is formed with its center portion depressed upwards, that is, toward the switching chamber (10) side. Namely, the center portion of the bottom wall (22) is formed in the form of a roughly truncated cone by drawing working, in such a way as to project toward the inside of the switching chamber (10). And, the pipe (11) is fixed in the state of piercing by resistance welding to a horizontal pipe attachment surface (25a) at the top of the depressed portion (25). The pipe (11) is housed in a space inside the depressed portion (25) so that its lower end does not project downward from the bottom surface of the lid fitting (24).

On the bottom wall (22)) of the lid fitting (24), a ring-shaped spring receiving surface (26) for receiving the lower end of the coil spring (14) disposed in the switching chamber (10) is provided on the outer circumference of the basic extremity of the depressed portion (25). The coil spring (14) is arranged on the spring receiving surface (26) in such a manner as to surround the depressed portion (25) and positioned on the outer circumference of the depressed portion (25).

A press-fitting area (27) of the second diaphragm (6) is also provided on the circumferential edge portion of the bottom wall (22) of the lid fitting (24). The second diaphragm (6) is press-fitted from the upper portion on the opening side of the lid fitting (24), and its outer circumferential portion is fitted and secured to the inner circumferential surface of the side wall (23) in the press-fitting area (27).

An abutting surface (28) of the stopper rubber portion (65) is further provided around the spring receiving surface (26) up to the press-fitting area (27) on the bottom wall (22) of the lid fitting (24). Since the stopper rubber portion (65) abuts on the abutting surface (28) when introducing the negative pressure into the switching chamber (10), the forcing or pushing-in auxiliary member (62) of the second diaphragm (6) is restrained from falling more than required.

Figure 4:
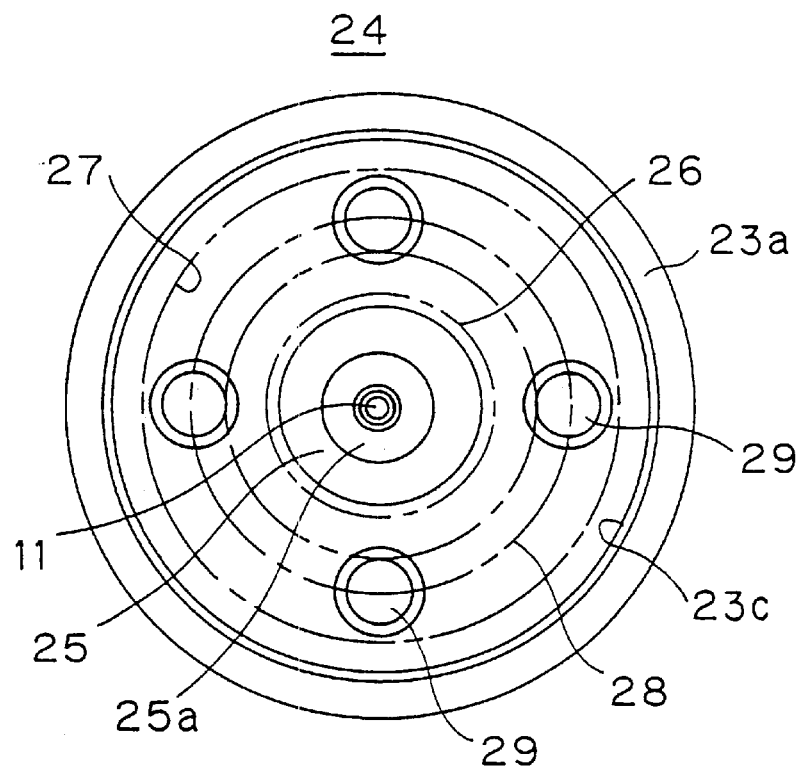
FIG. 4 is a plan view of the lid fitting.
Figure 5:
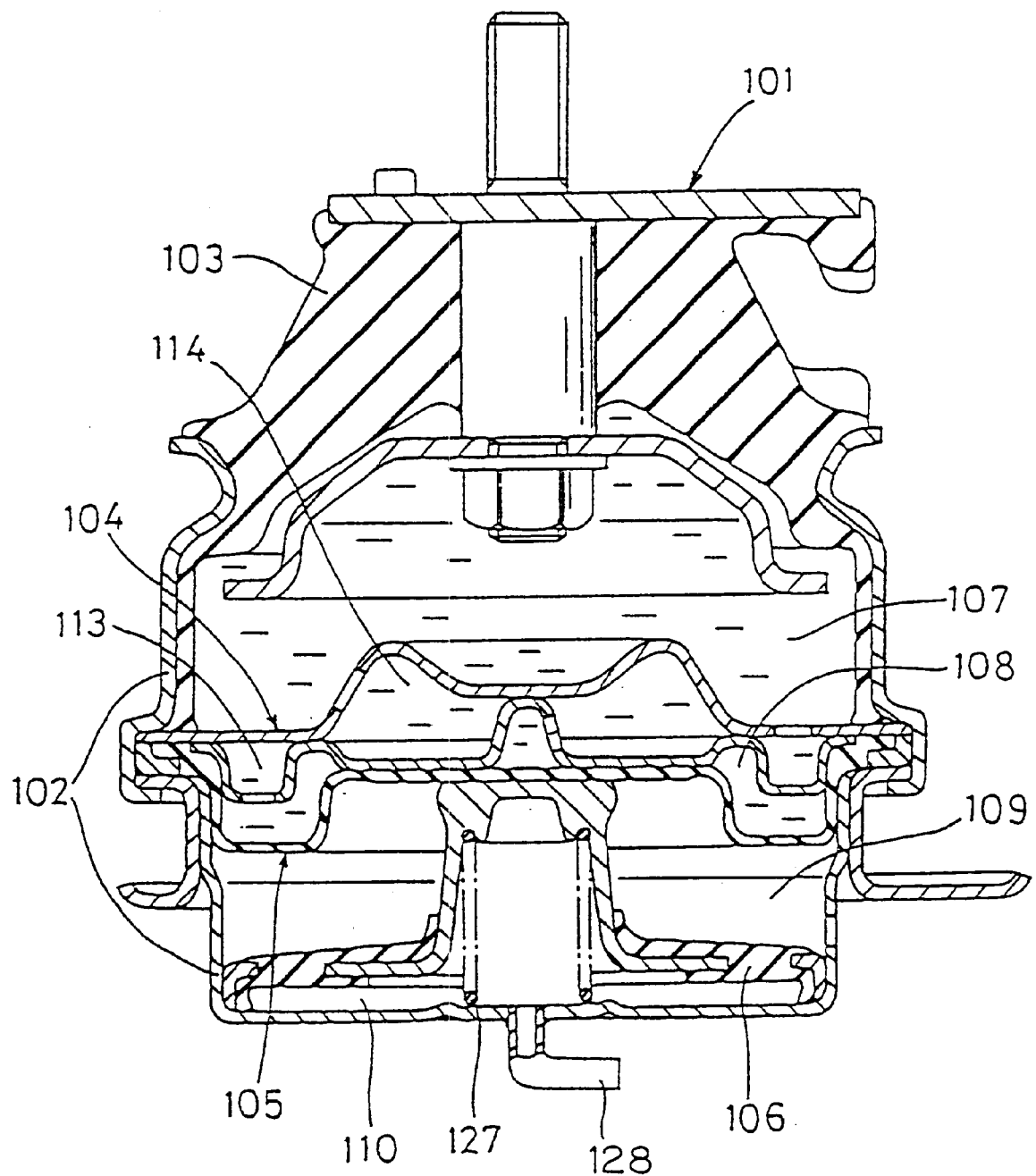
FIG. 5 is a longitudinal sectional view of a conventional switching type liquid-in vibration isolating device.

As shown in FIGS. 1 and 4, a plurality of circular convex portions (29) projecting downward, that is, slightly outwardly are provided on the bottom wall (22) of the lid fitting (24). The convex portions (29) serve to avoid the pipe (11) from interfering with the placing surface of such as work or transport stands even if the lower end of the pipe (11) slightly projects from the bottom surface of the lid fitting (24). That is, since the pipe (11) terminates above the lower surface of the convex portions (29) even if the lower end of the pipe (11) projects within or from the depressed portion (25), interference with the placing surface is avoided. It is preferably that the convex portions (29) are provided circumferentially at three or more places, and in this embodiment four convex portions are provided circumferentially at equal intervals. The convex portions (29) are provided at the positions corresponding to the abutting surface (28) on the stopper rubber portion (65). Since it is not necessary to secure the abutting surface (28) on the stopper rubber portion (65) all over in the circumferential direction, the convex portions (29) for interference prevention can be provided for the portions corresponding to the abutting surface (28) without impairing the performance.

As for the switching type liquid-in vibration isolating device configured above, the vibration isolating substrate (3) is deformed due to vibration propagated from the vibration generating source side such as power unit, by the deformation the liquid in the main liquid chamber (7) flows into and/or flows from the sub-liquid chamber (8) through the outside orifice (12) or inside orifice (13) provided on the partition member (4), and then vibration is greatly damped due to resonant characteristics of the outside and inside orifices (12), (13).

FIG. 1 shows the state that the atmospheric pressure is brought in the switching chamber (10) through the pipe (11). Under this condition, the valve body (52) at the center portion of the first diaphragm (5) is forced onto the partition member (4) side through the forcing or pushing-in auxiliary member (62) by means of energizing force of the coil spring (14), and the flat rubber surface (53) of the valve body (52) abuts on the lower surface of the partition member (4) to block up the inside orifice (13). Accordingly, the liquid flows through the outside orifice (12) between the main liquid chamber (7) and the sub-liquid chamber (8). Therefore, vibration in the frequency range in which damping effect can effectively be carried out by the outside orifice (12), for example, shake vibration, can be damped effectively.

Figure 2:
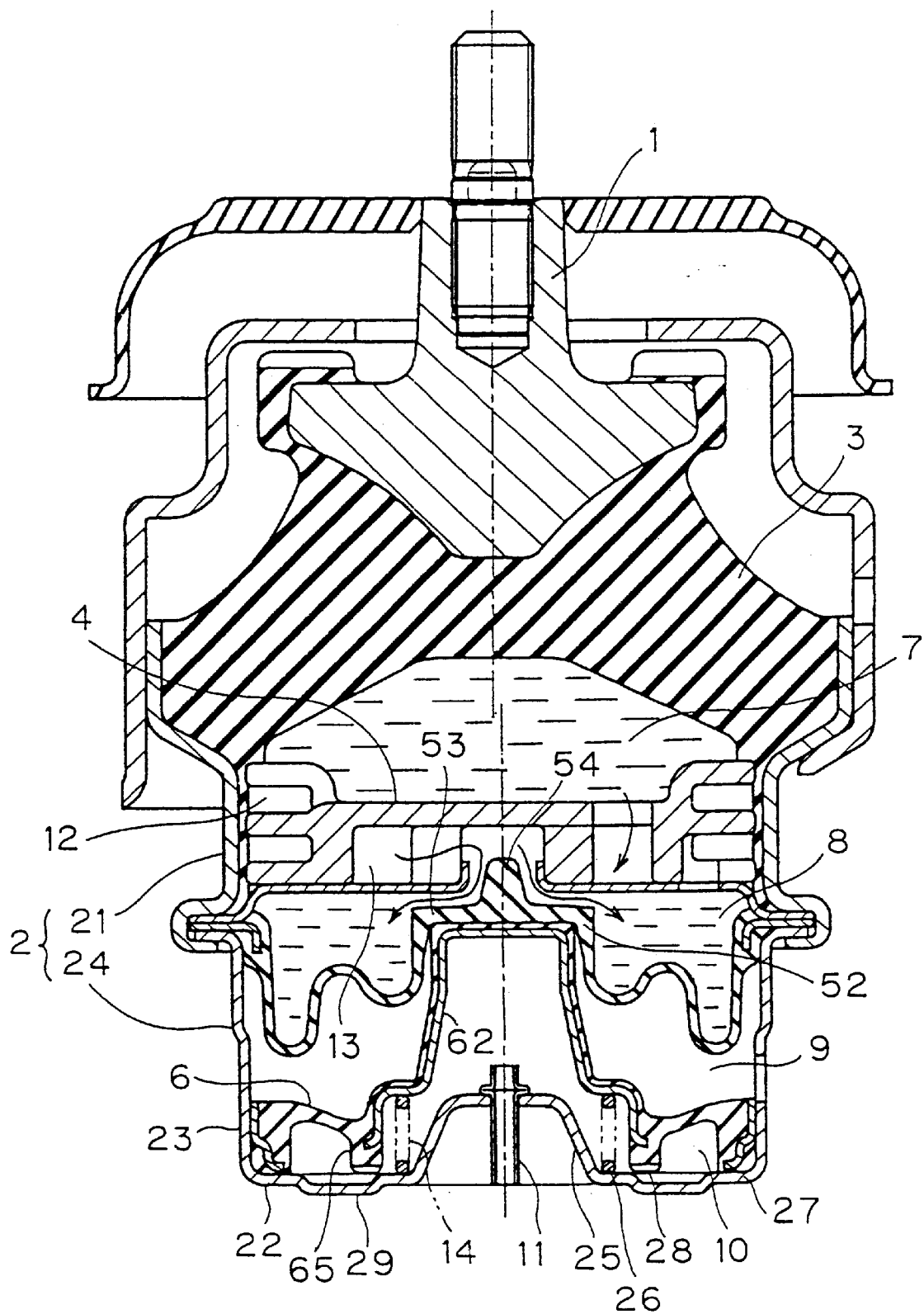
FIG. 2 is a longitudinal sectional view showing the state of introducing the negative pressure into the switching chamber of the switching type liquid-in vibration isolating device.

On the other hand, FIG. 2 shows the state that the negative pressure is brought in the switching chamber (10). In this case, when the negative pressure is brought in the switching chamber (10), the second diaphragm (6) is sucked toward the bottom wall (22) side of the second fitting (2) together with the forcing or pushing-in auxiliary member (62) and consequently moves downward together with the valve body (52) against the energizing force of the coil spring (14), the flat rubber surface (53) separates from the lower surface of the partition member (4), the inside orifice (13) becomes in the state of open to the sub-liquid chamber (8), and the main liquid chamber (7) and the sub-liquid chamber (8) become in the state of connection. At this time, since the inside orifice (13) has larger sectional area than the outside orifice (12) and also short distance of liquid-flow, the liquid flows through the inside orifice (13) without flowing through the outside orifice (12), thus vibration in the frequency range in which damping effect can effectively be carried out by the inside orifice (13), for example, idle vibration, can be damped effectively.

According to the liquid-in vibration isolating device of this embodiment described above, the pipe (11) is not projected downwardly from the bottom surface of the second fitting (2) by providing the depressed portion (25) on the bottom wall (22) of the second fitting (2) and receiving the pipe (11), for introducing the pressure, inside the depressed portion (25) and also providing the convex portions for interference prevention (29) around the depressed portion (25). Therefore, when the vibration isolating device is placed on a work or transport stand before placing the vibration isolating device on board of the vehicle, the pipe (11) will not support deadweight of the vibration isolating device, securely preventing the pipe from being disconnected.

It is also possible to settle a problem of pipe disconnection described above without impairing the performance of the switching type liquid-in vibration isolating device, by providing the depressed portion (25) for receiving the pipe as described above, while securing the receiving surface (26) of the coil spring (14), the press-fitting area (27) of the second diaphragm (6) and the abutting surface (28) of the stopper rubber portion (65), on the bottom wall (22).

INDUSTRIAL APPLICABILITY

As described above, according to the invention, it is possible to securely prevent pipe disconnection for introducing the atmospheric and negative pressure into the switching chamber and to provide the switching type liquid-in vibration isolating device with less fraction defective and superior productivity.

What is claimed is:

1. A switching type liquid-in vibration isolating device comprising:
   a first fitting,
   a second fitting in the form of a bottomed cylindrical body with a bottom wall located at a given distance in the direction of an axis from the first fitting,
   a vibration isolating substrate made of a rubber elastomer interposed between the first and second fittings to connect both fittings,
   a partition member, a first and second diaphragm disposed serially in the direction of the axis within a hollow space between the vibration isolating substrate and the second fitting,
   a first liquid chamber formed between the vibration isolating substrate and the partition member,
   a second liquid chamber formed between the partition member and the first diaphragm,
   an outside orifice interconnecting between the first and second liquid chambers disposed on the partition member, an inside orifice located in the partition member further radially inwardly from the outside orifice, a equilibrium chamber formed between the first diaphragm and the second diaphragm, a switching chamber formed between the second diaphragm and the second fitting for selectively receiving atmospheric pressure and negative pressure, and biasing means biasing the first diaphragm against the partition member, the first diaphragm being biased against the partition member by the biasing means to close the inside orifice when introducing the atmospheric pressure into the switching chamber, and the first diaphragm being separated from the partition member against the bias exerted by the biasing means to open the inside orifice when introducing the negative pressure into the switching chamber, the bottom wall of the second fitting having depressed portion deformed inward toward the inside orifice to form a recessed cavity in a bottom outer surface of the bottom wall, the recess cavity having a top side most inwardly disposed, a pipe for introducing the atmospheric and negative pressure into the switching chamber, the pipe having a first end extending through the top side of the depressed portion and a second end terminating proximate a level of said bottom outer surface, said bottom wall having a plurality of convex portions extending outwardly downward from the bottom outer surface of the bottom wall to positions lower than the pipe to support the isolating device such that damage to the pipe is prevented when the isolating device is placed on a surface prior to installation; and the convex portions being disposed around the depressed portion.

2. The switching type liquid-in vibration isolating device as set forth in claim 1, wherein a press-fitting area of the second diaphragm is secured at a circumferential edge portion of the bottom wall of the second fitting, and the second diaphragm is press-fitted from an opening side of the second fitting.

3. The switching type liquid-in vibration isolating device as set forth in claim 1 or 2, wherein the biasing means is a coil spring, interposed between the bottom wall of the second fitting and the second diaphragm in the switching chamber, for biasing the first diaphragm via the second diaphragm against the partition member, the bottom wall forms a receiving surface around the depressed portion on which the coil spring is disposed to surround the depressed portion.

4. The switching type liquid-in vibration isolating device as set forth in claims 1 or 2, wherein a stopper rubber portion is provided on a bottom surface of the second diaphragm, and the bottom wall forms an abutting surface around the depressed portion of the second fitting against which the stopper rubber portion abuts when the negative pressure is introduced.

5. The switching type liquid-in vibration isolating device as set forth in claim 4, wherein the convex portions are provided on the bottom wall at portions disposed in the abutting surface for the stopper rubber portion.

6. The switching type liquid-in vibration isolating device as set forth in claim 1, further comprising:

a stopper rubber portion provided on a bottom surface of the second diaphragm, the biasing means being a coil spring interposed between the bottom wall of the second fitting and the second diaphragm in the switching chamber, for biasing the first diaphragm via the second diaphragm against the partition member, the bottom wall forming a receiving surface for the coil spring around the depressed portion, the second diaphragm having a press fit portion press fitted at a circumferential edge portion of the bottom wall of the second fitting, the bottom wall defining an abutting surface, for the stopper rubber to abut against, between the receiving surface and the press fit portion of the second diaphragm, the coil spring being disposed on the receiving surface in such a manner as to surround the depressed portion, and the second diaphragm being press fit via an opening side of the second fitting.

* * * * *